Figures 4, 5:
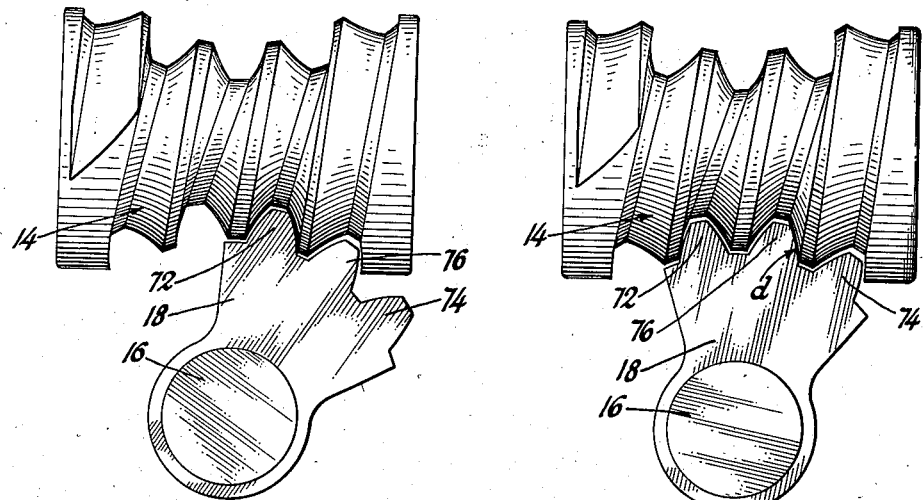

Jan. 19, 1937.  W. A. KULL ET AL  2,067,969
FORKED SECTOR GEAR
Filed April 27, 1934  2 Sheets-Sheet 1
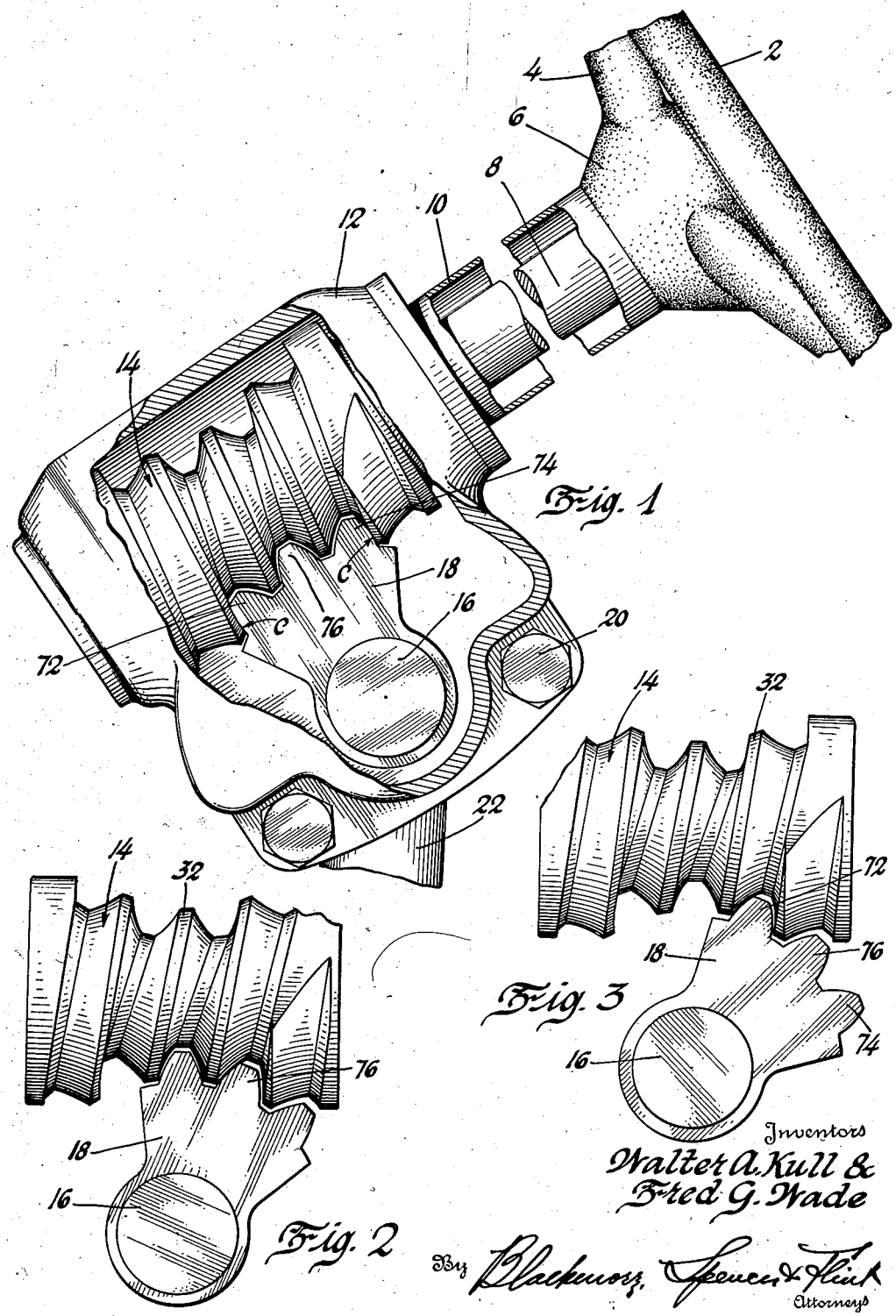
Inventors
Walter A. Kull &
Fred G. Wade Jan. 19, 1937. W. A. KULL ET AL 2,067,969
FORKED SECTOR GEAR
Filed April 27, 1934 2 Sheets-Sheet 2

Inventors
Walter A. Kull &
Fred G. Wade

By Blackmore, Bowen & Flint
Attorneys

Patented Jan. 19, 1937

2,067,969

UNITED STATES PATENT OFFICE 2,067,969

FORKED SECTOR GEAR

Walter A. Kull and Fred. G. Wade, Saginaw, Mich., assignors to General Motors Corporation, Detroit, Mich., a corporation of Delaware Application April 27, 1934, Serial No. 722,642

5 Claims. (Cl. 74—458)

This invention relates to steering gears, and has particular reference to an hour-glass worm used in connection with a gear sector having three teeth.

It is impractical in any worm gearing to make the worm an exact fit with the gear as when they are exactly complementary, any movement, even that occurring through spring of the metal of the worm and sector parts themselves or any slight give in their bearing, will result in an intolerable cramping and consequent galling of the meeting tooth faces.

This is true not only of a "Hindley" or double enveloping gear in which both the worm and the sector are throated, but with a throated worm and plain sector it is necessary from a practical standpoint to have the throat of the worm cut or curved on a slightly larger radius than the gear so that the worm may move axially to accommodate tolerances that must be allowed for bearing location adjustments and even temperature changes.

The foregoing applies to worm gearing wherein the transmission of movement one to the other is comparatively constant and wherein the entire peripheries of both worm and gear are traversed by one another, but in actual automotive vehicle practice it has been found that the steering shaft is held for the greater part of the time in a position corresponding to the straight-ahead or straight-line movement of the vehicle. This will necessarily cause the greatest amount of wear to fall on the middle tooth of the sector which meshes with the hour-glass worm, and in making an adjustment for wear it has been and still is quite a general practice to make the sector part of the gear as shown in the expired patent to Sweet No. 893,032 wherein the pitch line of the teeth of the gear member has a shorter radius than that of the rotation of such gear sector.

This gear sector when formed as above described permits it to be adjusted toward the worm to compensate for wear until such time as the end teeth will interfere with the center of the worm when passing the same. However, with the center tooth alone contacting the worm thread in straightaway driving, there is a reciprocation of turning effort commonly termed "kick-back" due to the customary ratio between the worm and gear sector and the consequent angle of lead on the worm thread which enables the sector to drive or rotate the worm.

This reversal of power transmission will occur when one of the road wheels controlled by the steering gear meets an obstruction in excess of what might be met by the other wheel, and the resultant "kick back" to the steering wheel is not only annoying but sometimes dangerous, especially when the tire of one road wheel becomes suddenly deflated as in the case of a "blow-out".

It is an object of the present invention to greatly alleviate this objectionable "kick back" and yet leave sufficient reversal of motion to give the driver an indication of road conditions commonly termed "road feel", and at the same time provide for wear adjustment.

In experimenting with the hour-glass worm and sector type of steering mechanisms, we found that if the hour-glass worm is cut so that its middle zone or gorge is cut deeper, giving the effect of a shorter pitch radius than the mating gear sector that, for straightaway driving, when a three-toothed sector is used, all the contact will come on the outermost side of the outermost teeth, leaving the middle tooth and the inner faces of the outer teeth clear of the worm. This will bring most of the wear on the outer surfaces of the outer teeth and allow a ready takeup between the worm and sector when the parts begin to wear.

A further advantage obviated in this combination is in the straightaway driving position, which is the position of most duty throughout the life of the steering gear: there is reduced reversal of internal stresses caused by a reversal of the gear loading. In a three-tooth sector the outer face of one outermost tooth and its contacting part of the worm thread takes loads or shocks coming to the mechanism from one direction, and the outer face of the other outermost tooth and its contacting part of the worm thread takes the loads or shocks coming from the other direction. Thus there is no reciprocating of concentrated stresses on the center tooth, inherently the weakest part of the gear members.

Another advantage to be had from this outer tooth face contact, is a more irreversible, a more stable, steering gear. Reversibility is caused and aided by a steep helix angle on the worm. In the hour-glass type of worm, the helix angle is of course steepest in the center, the region of smallest diameter. By making contact at the outer face of the outer sector teeth, we are using normally the part of the worm helix which has a reduced helix angle,—thus giving a more stable steering gear during straightaway driving.

This hour glass worm is cut with a tool guided by a cam which will produce the same pitch cutting radius for the two outer or end zones of the worm, and a different or longer pitch cutting radius for the middle zone or gorge of the hour glass worm.

On the drawings:

Figure 1 shows the steering column of an automotive vehicle with parts broken away to illustrate the invention.

Figures 2 to 5 inclusive show different positions of the worm and sector.

Figure 6:
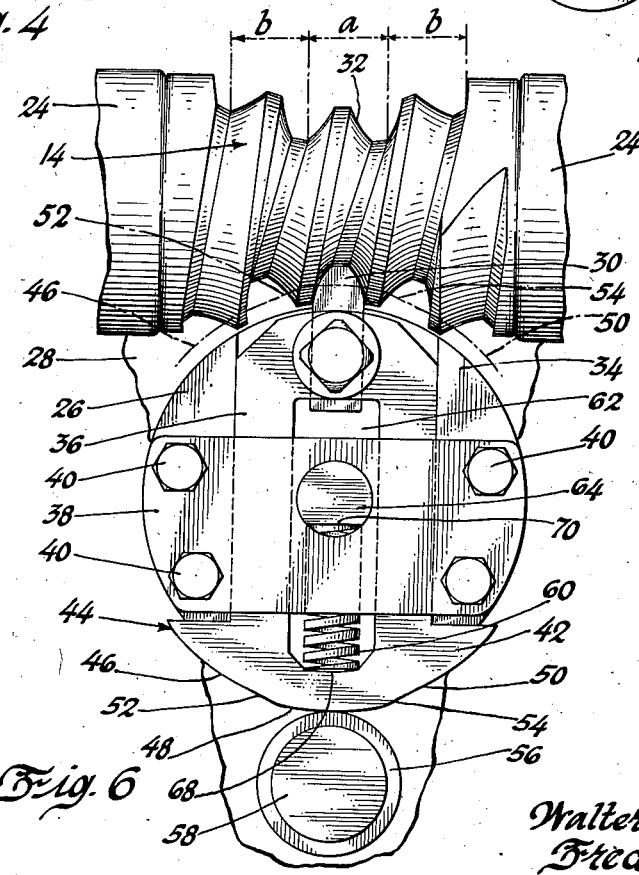

Figure 6 is a plan view of the cutter and cutting mechanism for shaping the hour glass worm.

Referring to the drawings, the numeral 2 indicates the steering wheel of an automotive vehicle having the usual spider arms 4 and hub 6 attached to the steering shaft 8 enclosed within the stationary column 10. The column 10 is rigidly mounted at its lower end in the housing 12 in which there is mounted in anti-friction bearings (not shown) the hour glass worm 14. The worm 14 is secured to the shaft 8.

In the housing 12 there is also mounted the rocker arm shaft 16 to which there is rigidly secured the three toothed sector 18 which meshes with the worm 14. The housing 12 is provided with a suitable cover and is secured to the chassis frame or other part of the vehicle by means of the machine bolts 20. A rocker arm 22 is secured to the shaft 16 exteriorly of the housing 12 and operates the usual linkage to steer the road wheels of the vehicle.

Referring to Figure 6, the worm 14 is shown as held on the rotatable hob arbor 24 of the hobbing machine. The tool holding fixture 26 is rotatably mounted on the work table 28 of the machine. The hob arbor 24 and the tool holder fixture 26 operate in timed relation so that the cutting tool 30 will properly cut the worm thread 32 on the worm 14.

The tool holder fixture 26 comprises the rotatable table 34 in which there is slidably mounted the tool holder 36. A top plate 38 secured to the table 34 by means of the machine bolts 40 slidably confines the tool holder in a slide in the table 34.

The rear end 42 of the tool holder slide 36 is formed into a cam 44. The cam 44 includes the cam surfaces 46, 48 and 50, the cam surfaces 46 and 50 being struck from the same center, while the cam 48 is partly struck from the same center but joined to the cam surfaces 46 and 50 at 52 and 54 by a slope or change from one to the other, giving over the entire cam a shape closely approximating the shape that would be generated if a single shorter radius was used for the entire cam.

The surface of the cam 44 rides on a roller 56 mounted on the stationary shaft 58. A coil spring 60 in a slot 62 in the tool holder 36 is confined between the axle 64 and the end 68 of the slot 62. The axle 64 has a flat 70 to receive the spring, the purpose of which is to push the surface of the cam 44 constantly in engagement with the roller 56.

As the table 34 of the tool holding fixture 26 rotates, it will rotate the cutting tool 30 and cause it to cut the thread 32 on the worm, the position of the tool being determined by the position of its cam end 44 against the roller 56. In the position shown in Figure 6, the cam end 48 will push the cutting tool 30 deeper into the hourglass worm 14 and cause it to cut deeper into the worm or cut a deeper gorge than normally is cut, such action being the equivalent of cutting the throat portion of the worm on a shorter radius than the end portions. As the tool rotates, the cam surface 48 will move past the roller and cause the cam surface 50 to take onto the roller. The tool 30 will now be pushed back by the work and the spring 60 so that the tool will now operate on the cam surfaces 46 or 50 struck from the same center as the cam surface 48 on the normal, and cut the normal or regular profile or thread shape. This will cause the tool 30 to cut less deep into the worm, or give end zone portions to the worm which have the cutting tool operating on a different pitch radius. Accordingly, then, there will be a center zone or the gorge of the worm indicated by $a$ which will have a thread 32 which is cut on a pitch radius which is different from the end portions $b$ of the worm. The reason for this difference in the pitch radii of the worm and the operation of the sector 18 in connection therewith will best be illustrated by a comparison of Figures 1 to 5 inclusive.

By noting Figure 1, it will be seen that the contact of the end teeth 72 and 74 of the sector 18 with the hour glass worm 14 is at $c$, or at the outer surface of the teeth where they engage the worm thread at the end worm. A further examination of the drawings will show that the inner surfaces of the outer teeth 74 and the entire center tooth 76 are out of contact with the worm, or in other words, clearance has been provided (the showing on the drawings is somewhat exaggerated for purposes of clearer illustration). As the operator of the vehicle turns the steering wheel 2 to move the worm 14, the parts will shortly assume the position shown in Figure 2. In this figure the endmost tooth 72 has moved toward the center zone or gorge of the worm and, because of the clearance at the middle, is no longer in contact with the worm thread 32. The contact now is between the left hand surface of the middle tooth 76 and the worm thread 32. As the worm continues to rotate and to turn the sector 18, the parts will eventually reach the extreme position shown in Figure 3. In this position the center tooth 76 has left the worm thread 32 and the contact now is with the end tooth 72 and the worm thread 32. During the reverse movement, as the operator turns the wheel in the reverse direction, the worm thread will engage the inside face of the end tooth 72 and turn the sector to the left. As the sector continues to move, clearance is provided to allow the middle tooth 76 to get by the end portion of the worm. The continued movement of the hour glass worm will turn the tooth 72 toward the gorge at the middle and the clearance will now cause the load to be taken by the middle tooth 76 as indicated at $d$ in Figure 5. This contact will continue until the end tooth 74 comes into engagement with the thread when the parts will be returned to the position shown in Figure 1. Clearance now will again remove both faces of the center tooth from contact with the worm and also clear the inner faces of both end teeth 72 and 74.

It has been found that the change in the contact surfaces of the teeth as above illustrated gives better results in the life of the gear parts in the steering, and enables a better adjustment of the sector relative to the worm to take up wear.

We claim:

1. As an article of manufacture, an hour glass worm having its center or throat portion cut deeper than the normal pitch radius.

2. As an article of manufacture, an hour glass worm having end portions cut on a shorter pitch radius than a selected intermediate portion.

3. In combination with an hour glass worm having a thread the end portions of which have a pitch radius less than a selected intermediate portion, a sector meshing therewith and having a uniform pitch radius, said sector having a plurality of teeth and having its outermost teeth only in contact with the worm at their outermost faces when its intermediate tooth and all inner tooth faces are clear of the worm.

4. A steering gear comprising a housing, a throated worm, and a sector gear meshing with said worm, said sector gear having a pitch circle greater than the throat radius of said worm.

5. As an article of manufacture, an hour glass worm having its throat portion cut on a deeper pitch radius than its end portions.

WALTER A. KULL.
FRED. G. WADE.